(12) United States Patent
Choi et al.

(10) Patent No.: US 10,520,738 B2
(45) Date of Patent: Dec. 31, 2019

(54) OPTICAL APPARATUS

(71) Applicant: LG Innotek Co., Ltd., Seoul (KR)

(72) Inventors: Yong Bok Choi, Seoul (KR); Kwang Il Kim, Seoul (KR); Eun Sung Seo, Seoul (KR); Sang Hun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/553,515

(22) PCT Filed: Apr. 12, 2016

(86) PCT No.: PCT/IB2016/000458
§ 371 (c)(1),
(2) Date: Aug. 24, 2017

(87) PCT Pub. No.: WO2016/135563
PCT Pub. Date: Sep. 1, 2016

(65) Prior Publication Data
US 2018/0039087 A1    Feb. 8, 2018

(30) Foreign Application Priority Data

Feb. 25, 2015  (KR) .................. 10-2015-0026384
Feb. 26, 2015  (KR) .................. 10-2015-0027224

(51) Int. Cl.
*G02B 27/01*    (2006.01)
*G02B 5/04*     (2006.01)
(Continued)

(52) U.S. Cl.
CPC .......... *G02B 27/0176* (2013.01); *G02B 5/04* (2013.01); *G02B 5/32* (2013.01); *G02B 6/0033* (2013.01);
(Continued)

(58) Field of Classification Search
CPC combination set(s) only.
See application file for complete search history.

(56) References Cited

U.S. PATENT DOCUMENTS 4,667,927 A * 5/1987 Oscarsson ......... A61M 5/16877
                                          251/181
5,347,400 A * 9/1994 Hunter ..................... G02B 3/08
                                            345/7
(Continued)

FOREIGN PATENT DOCUMENTS

JP    06-324284 A    11/1994
JP    09-236774 A     9/1997
(Continued)

OTHER PUBLICATIONS

International Search Report in International Application No. PCT/IB2016/000458, filed Apr. 12, 2016.

*Primary Examiner* — Jose R Soto Lopez
(74) *Attorney, Agent, or Firm* — Saliwanchik, Lloyd & Eisenschenk

(57) ABSTRACT

Disclosed is an optical apparatus including a display unit, a lens configured to pass an image formed by and transmitted from the display unit, a base configured to accommodate the lens therein, and an adjustment unit configured to move the lens relative to the base so as to adjust a path of light passing through the lens.

18 Claims, 10 Drawing Sheets

(51) Int. Cl.
*G02B 5/32* (2006.01)
*F21V 8/00* (2006.01)
*G02B 27/28* (2006.01)
*G02B 27/22* (2018.01)
*G02B 5/18* (2006.01)

(52) U.S. Cl.
CPC ......... *G02B 27/0172* (2013.01); *G02B 27/22* (2013.01); *G02B 27/286* (2013.01); *G02B 5/1809* (2013.01); *G02B 6/0056* (2013.01); *G02B 2027/0159* (2013.01); *G02B 2027/0174* (2013.01)

(56) References Cited

U.S. PATENT DOCUMENTS

| | | | | |
|---|---|---|---|---|
| 6,747,611 B1 * | 6/2004 | Budd | | G02B 27/0172 345/7 |
| 9,658,460 B2 * | 5/2017 | Lee | | G02B 27/0179 |
| 2002/0171605 A1 * | 11/2002 | Kim | | G02B 27/0176 345/8 |
| 2006/0250322 A1 * | 11/2006 | Hall | | G02B 27/0172 345/8 |
| 2007/0109657 A1 * | 5/2007 | Yoon | | G02B 27/2221 359/627 |
| 2008/0049190 A1 * | 2/2008 | Destain | | G02B 13/0015 353/20 |
| 2008/0169998 A1 * | 7/2008 | Jacobsen | | G02B 27/0172 345/8 |
| 2008/0239523 A1 * | 10/2008 | Beck | | G02B 27/0172 359/823 |
| 2009/0147229 A1 * | 6/2009 | Schaffer | | G02B 7/026 355/67 |
| 2010/0142015 A1 * | 6/2010 | Kuwahara | | G02B 5/32 359/3 |
| 2010/0187422 A1 * | 7/2010 | Kothari | | H05B 37/0227 250/353 |
| 2010/0302196 A1 * | 12/2010 | Han | | G06F 3/0425 345/173 |
| 2012/0032874 A1 * | 2/2012 | Mukawa | | G02B 3/12 345/8 |
| 2012/0044571 A1 * | 2/2012 | Mukawa | | G02B 27/0103 359/630 |
| 2012/0188635 A1 * | 7/2012 | Kubala | | G02B 7/003 359/356 |
| 2014/0002600 A1 * | 1/2014 | Kim | | H04N 13/239 348/43 |
| 2014/0002676 A1 * | 1/2014 | Ning | | G02B 7/14 348/187 |
| 2014/0016449 A1 * | 1/2014 | Harada | | G02B 7/09 369/112.23 |
| 2014/0340751 A1 * | 11/2014 | Konishi | | G02B 7/102 359/557 |
| 2014/0368657 A1 * | 12/2014 | Konuki | | B60R 1/00 348/148 |
| 2015/0010265 A1 * | 1/2015 | Popovich | | G02F 1/13342 385/10 |
| 2015/0138645 A1 * | 5/2015 | Yoo | | G02B 27/0101 359/630 |
| 2015/0277125 A1 * | 10/2015 | Hirano | | G02B 6/0088 359/633 |
| 2015/0277126 A1 * | 10/2015 | Hirano | | G02B 7/008 359/633 |
| 2015/0338660 A1 * | 11/2015 | Mukawa | | G02B 5/30 359/13 |
| 2016/0004102 A1 * | 1/2016 | Nisper | | G02B 3/14 351/158 |
| 2016/0154243 A1 * | 6/2016 | Aiki | | G02B 17/00 359/633 |
| 2016/0170565 A1 * | 6/2016 | Ilmonen | | G02B 6/005 345/175 |
| 2016/0266387 A1 * | 9/2016 | Tekolste | | G02B 27/0172 |
| 2016/0349517 A1 * | 12/2016 | Miyasaka | | G02B 6/29304 |
| 2016/0370524 A1 * | 12/2016 | Sasaki | | G02B 27/286 |
| 2017/0153411 A1 * | 6/2017 | Mitarai | | G02B 7/04 |
| 2017/0299794 A1 * | 10/2017 | Fattal | | G02B 6/34 |
| 2018/0003805 A1 * | 1/2018 | Popovich | | G02B 6/34 |
| 2018/0172998 A1 * | 6/2018 | Tekolste | | G02B 27/0172 |

FOREIGN PATENT DOCUMENTS

| | | |
|---|---|---|
| JP | 2002-072131 A | 3/2002 |
| JP | 2012-013908 A | 1/2012 |
| JP | 5229327 B2 | 7/2013 |
| KR | 10-0327942 B1 | 9/2005 |
| KR | 10-0612585 B1 | 4/2007 |

\* cited by examiner

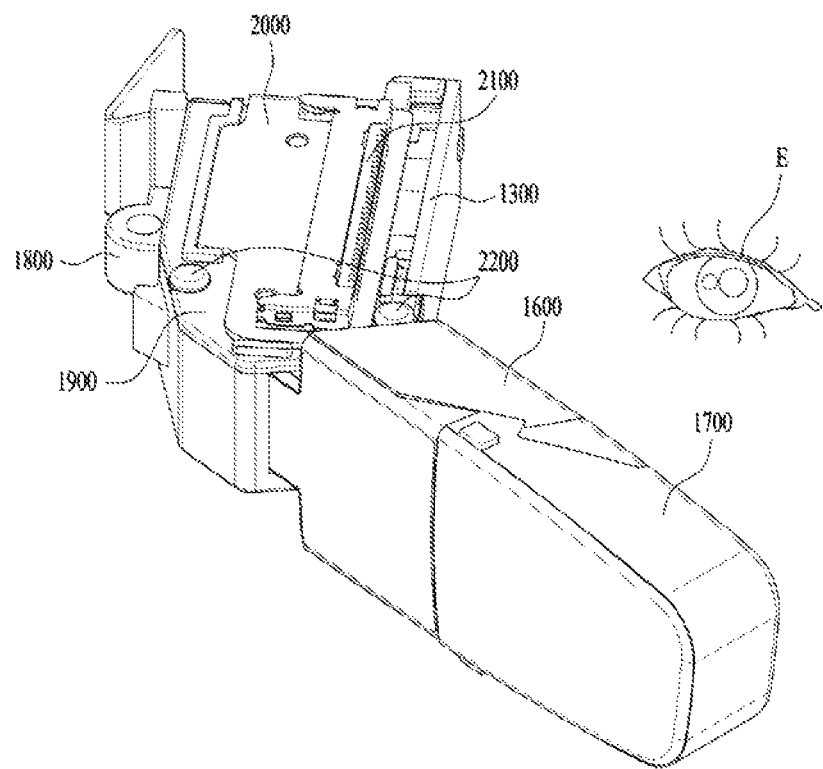
[FIG. 1]

[FIG. 2A]
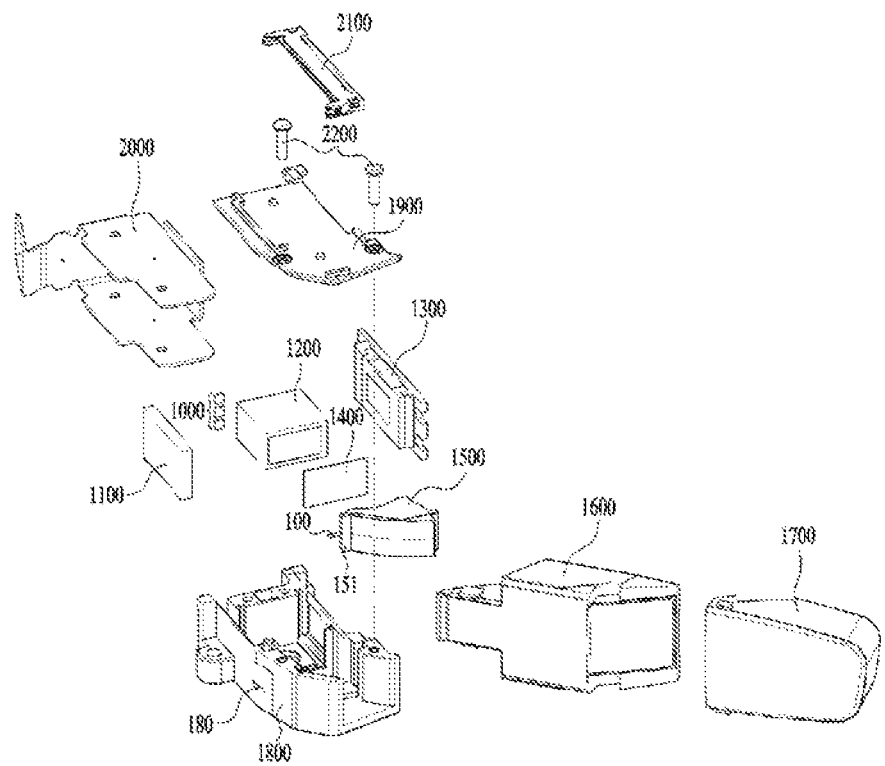
[FIG. 2B]
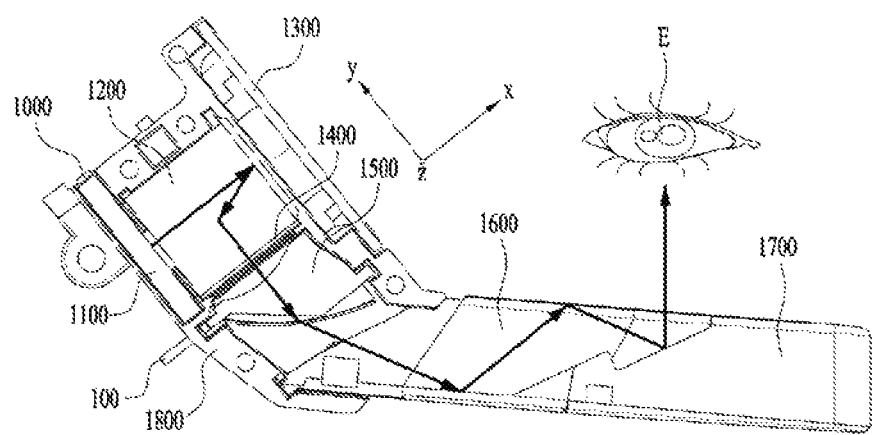

[FIG. 3]
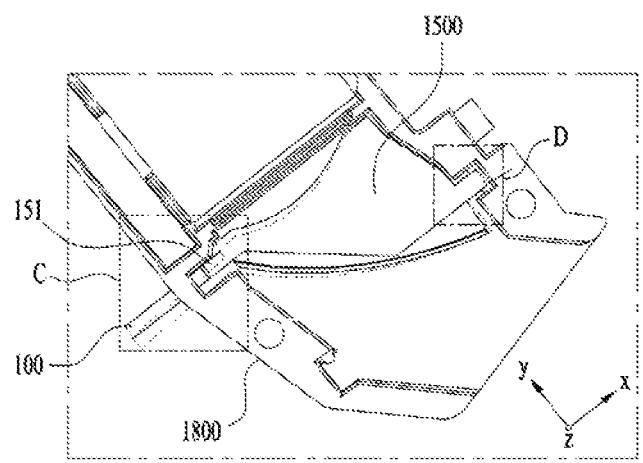
[FIG. 4]
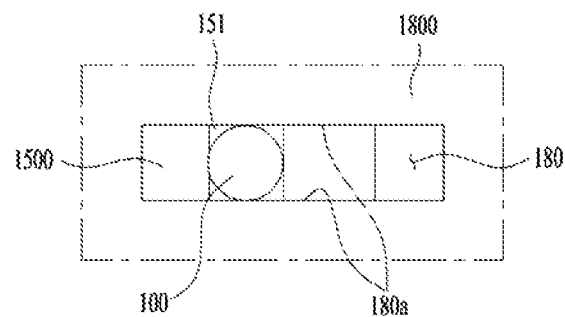

[FIG. 5A]
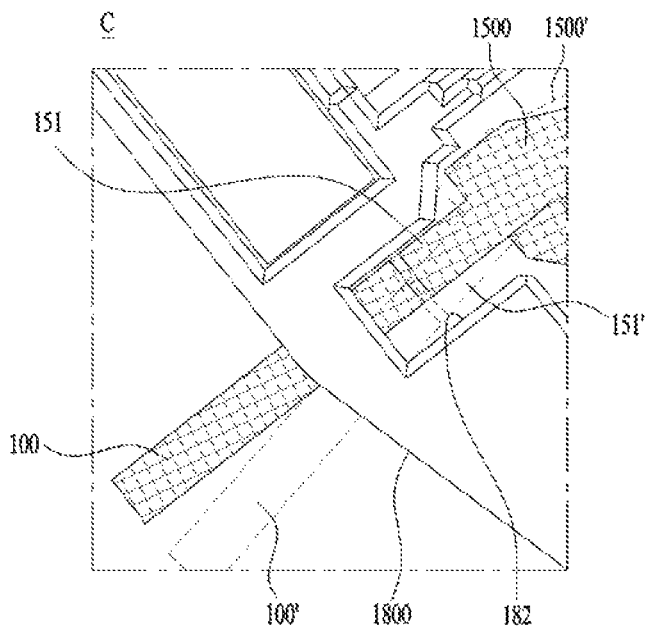
[FIG. 5B]
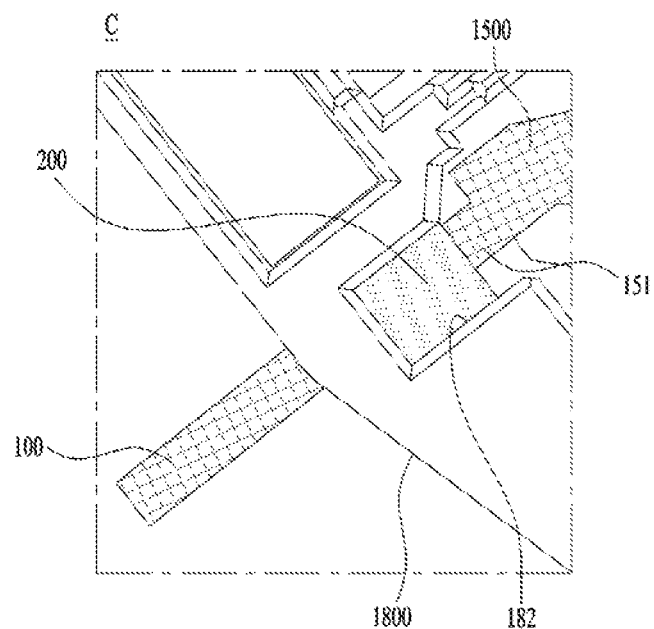

【FIG. 6】
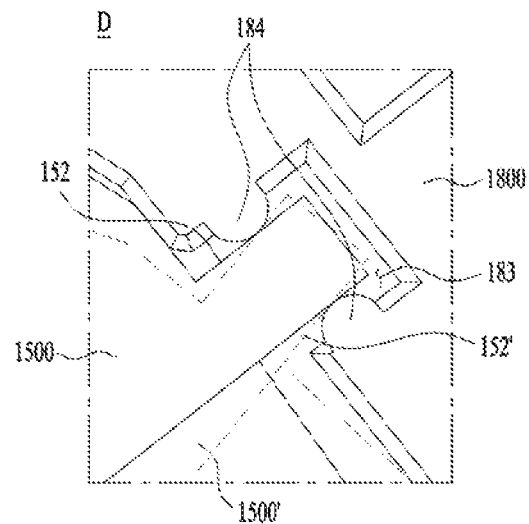
【FIG. 7】
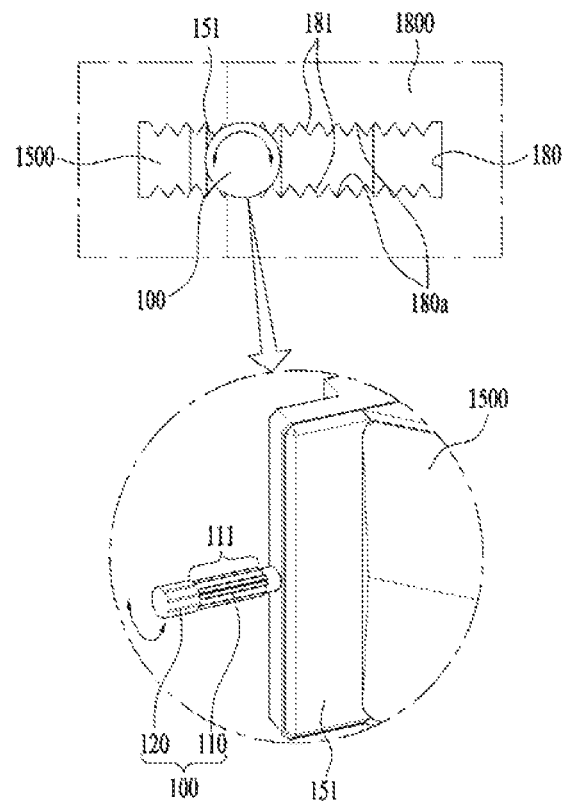

[FIG. 8]
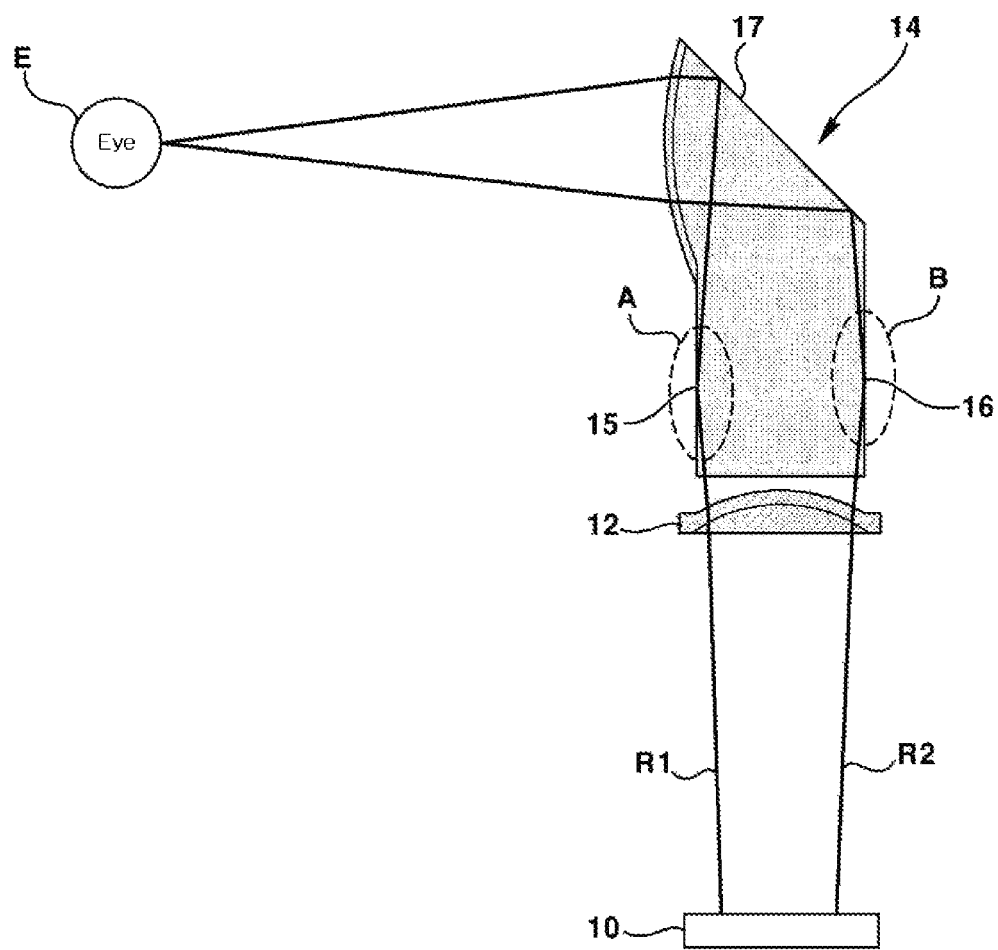

[FIG. 9]
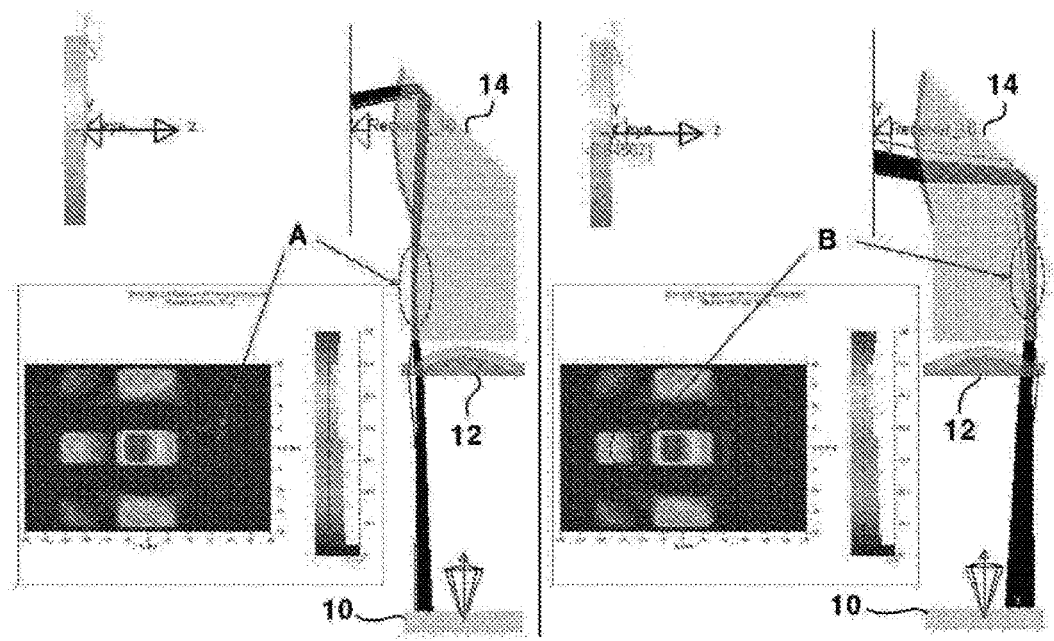

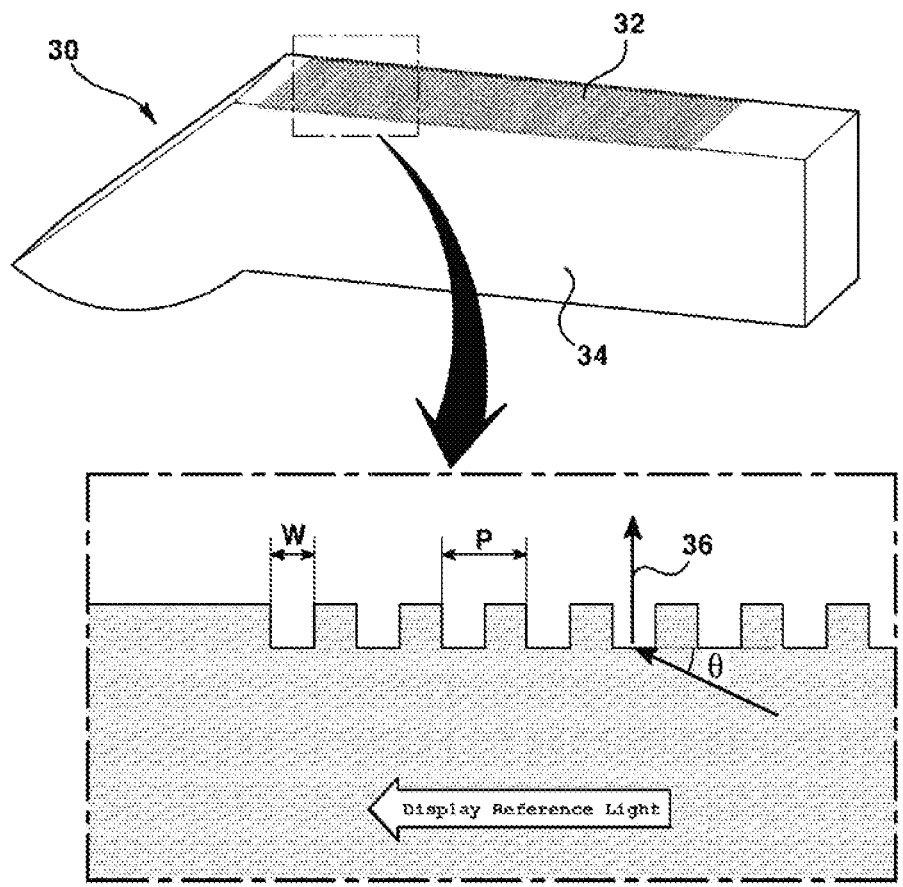
[FIG. 10]

[FIG. 11]
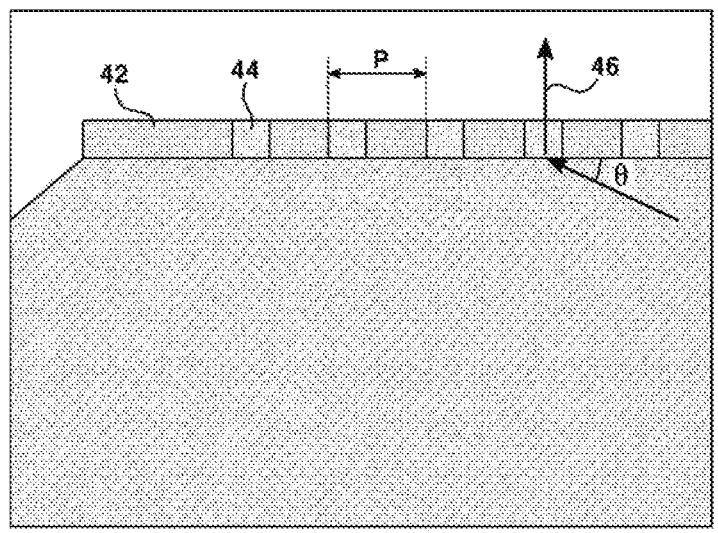

FIGs. 12(a)-12(b)

OPTICAL APPARATUS

CROSS-REFERENCE TO RELATED APPLICATIONS

This application is the U.S. national stage application of International Patent Application No. PCT/IB2016/000458, filed Apr. 12, 2016, which claims priority to Korean Application Nos. 10-2015-0026384, filed Feb. 25, 2015, and 10-2015-0027224, filed Feb. 26, 2015, the disclosures of each of which are incorporated herein by reference in their entirety.

TECHNICAL FIELD

Embodiments related to an optical apparatus.

BACKGROUND ART

The content described in this section merely provides background information regarding embodiments, and does not constitute the prior art.

An optical apparatus, such as, for example, a Head-mounted Display (HMD), is an apparatus that is devised to let a pilot know flight information including, for example, the altitude and speed of an airplane. General commercial products were invented in the 1990s, and commercialized products have received great attention since 1997.

An optical apparatus is an apparatus that is worn on the head, like a pair of glasses, so that an enlarged image is formed in front of user's eyes so as to allow the user to view the image. The display used in the optical apparatus generally has a size of 1 inch or less, but the user can view an enlarged screen approaching 100 times of the original size through the application of high-grade optical technology.

The growth of the wearable computing industry is expected due to the technical development and commercialization of peripheral appliances such as optical apparatuses. Although current optical apparatuses have mainly been developed for the enjoyment of movies or games, owing to the higher performance and smaller size of computer systems and to the rapid development of display apparatuses, which are exemplarily represented by LCDs and LEDs and of image communication technology, optical apparatuses have recently been studied and developed for use as wearable monitors, and commercialized products thereof have been launched.

Although the optical apparatus market has encountered difficulty in the past due to relatively high prices, it is expected that the market will rapidly grow along with the wearable computer industry. The application fields of optical apparatuses are expected to expand to industrial sites, sites for the maintenance of bulky products such as, for example, cars, airplanes, and ships, and warehouses, as well as to sports entertainment, such as car racing.

In particular, the development of processor and software technologies enables a reduction in the size of computing apparatuses. Optical apparatuses are expected to be developed for use in personal computing apparatuses, such as smart phones, rather than serving as a display apparatus that merely displays an image.

In the optical apparatuses, the adjustment of the optical path is very important. The adjustment of the optical path may be implemented by adjusting the position and attitude of a lens.

Meanwhile, an optical apparatus, which is configured so that adjustment of the position and attitude of a lens is impossible, has a fixed optical path, and therefore cannot remove an unintended image or an image containing noise.

Therefore, there is a demand for the development of an optical apparatus that is capable of removing an unintended image or an image containing noise by adjusting the position and attitude of a lens.

An optical apparatus, such as, for example, an HMD, requires a precise optical design in order to focus at a short distance because a display panel is located at a position close to the user's eyes. Studies aimed at meeting this requirement as well as studies aimed at reducing the fatigue of the user's eyes and wearing inconvenience have been conducted.

In addition, when attempting to increase resolution, flaring or ghosting may occur even when focusing is accurate, thus causing the formation of an undesired image or a blurry image.

Therefore, it is necessary to remove noise generated by external light, rather than light generated in a display device.

DISCLOSURE

Technical Problem

Therefore, it is one object of the embodiments to provide an optical apparatus that is capable of removing an unintended image or an image containing noise by adjusting the position and attitude of a lens.

In addition, it is another object of the embodiments to provide an optical apparatus that is capable of preventing the occurrence of flaring or ghosting due to external light.

The objects of the embodiments should not be limited to the aforementioned objects, and other unmentioned objects will be clearly understood by those skilled in the art from the following description.

Technical Solution

In accordance with one embodiment, an optical apparatus includes a display unit, a lens configured to pass an image formed by and transmitted from the display unit, a base configured to accommodate the lens therein, and an adjustment unit configured to move the lens relative to the base so as to adjust a path of light passing through the lens.

In accordance with another embodiment, an optical apparatus includes a lens, a base configured to accommodate the lens therein, and an adjustment lever having one end coupled to the lens and an opposite end exposed outside the base, the adjustment lever being configured to adjust a path of light passing through the lens as a user moves the lens relative to the base by moving the opposite end.

In accordance with a further embodiment, an optical apparatus includes a housing configured to change a path of light of an image emitted from a display device so as to provide an observer with the resulting image, wherein the housing includes a reflective surface configured to reflect light emitted from the display device, and a mirror inclined relative to the reflective face by a prescribed angle so as to emit the light reflected from the reflective surface to an outside, and wherein the housing has any one of a grating structure, a holographic optical element, and a moth eye structure.

Advantageous Effects

In an embodiment, through the provision of an adjustment unit, which may be directly adjusted by a user and functions to move a lens, an optical apparatus may easily adjust the path of light passing through the lens, thereby optimizing the path of light.

In an embodiment, through the provision of an adjustment unit, which may be directly adjusted by a user and functions to adjust the angle of a lens, an optical apparatus may easily adjust the path of light passing through the lens, thereby optimizing the path of light.

Accordingly, it is possible to improve the quality of an image displayed on the optical apparatus by removing an unintended image or an image containing noise, which are generated due to the unintended formation of the path of light.

The optical apparatus of the embodiments may prevent ghosting or flaring caused by external light.

DESCRIPTION OF DRAWINGS

FIG. 1 is a perspective view illustrating an optical apparatus in accordance with one embodiment;

FIG. 2A is an exploded perspective view illustrating the optical apparatus in accordance with one embodiment;

FIG. 2B is a plan view illustrating the path of light, which forms an image, in the optical apparatus in accordance with one embodiment;

FIG. 3 is a plan view illustrating a portion of the optical apparatus in accordance with one embodiment;

FIG. 4 is an enlarged front view of portion C in FIG. 3;

FIG. 5A is an enlarged plan view of portion C in FIG. 3;

FIG. 5B is a view illustrating a filler added to FIG. 5A;

FIG. 6 is an enlarged plan view of portion D in FIG. 3;

FIG. 7 is a view illustrating an adjustment lever in accordance with another embodiment;

FIG. 8 is a view illustrating a head-mounted display apparatus, which is one embodiment of the optical apparatus;

FIG. 9 is a view illustrating the results of the simulation of the generation of miscellaneous light in the head-mounted display apparatus;

FIG. 10 is a view illustrating a grating structure applied to a housing in the optical apparatus in accordance with one embodiment;

FIG. 11 is a view illustrating a holographic optical element applied to the optical apparatus in accordance with one embodiment.

BEST MODE

Figure 12A:
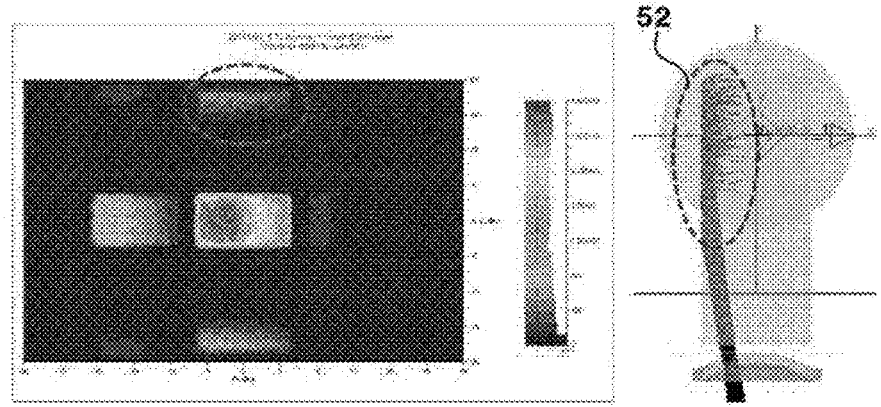
FIGS. 12(a) and 12(b) are views illustrating the measured results of the simulation of the generation of miscellaneous light in a conventional optical apparatus and the optical apparatus in accordance with the embodiment.

Hereinafter, exemplary embodiments will be described in detail with reference to the accompanying drawings. The embodiments may be modified in various ways and may have various forms, and specific embodiments will be illustrated in the drawings and will be described in detail herein. However, this is not intended to limit the embodiments to the specific embodiments, and the embodiment should be understood as including all modifications, equivalents, and replacements that fall within the sprit and technical scope of the embodiments. In this process, the size, shape or the like of components illustrated in the drawings may be exaggerated for the clarity and convenience of description.

Although the terms "first" and "second" and the like may be used to describe various elements, the embodiments should not be limited by the terms. These terms are used for distinguishing between similar elements. In addition, terms, which are specially defined in consideration of the configurations and operations of the embodiments, are given only to explain the embodiments, and do not limit the scope of the embodiments.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In addition, the relative terms "top/upper/above", "bottom/lower/under" and the like in the description and in the claims may be used to distinguish between any one substance or element and other substances or elements and not necessarily for describing any physical or logical relationship between the substances or elements or a particular order.

In addition, in the respective drawings, a rectangular coordinate system (x, y, z) may be used. In FIGS. 1 to 7, the x-axis is the axis parallel to the width direction of a base, the z-axis is the axis parallel to the vertical direction, which is perpendicular to the width direction of the base, the y-axis is the axis perpendicular to the x-axis and the z-axis.

In the embodiments, an optical apparatus is an apparatus that is wearable on the human body, like a pair of glasses, and allows a human to view an image transmitted from an external apparatus with fewer limitations as to place. The apparatus, which is the source of the transmitted image, may be a smart phone or any other mobile appliance, and may be connected to the optical apparatus in a wired or wireless manner.

At this time, in order to wear the optical apparatus in accordance with the embodiments, the optical apparatus may be separably coupled to glasses, or may be coupled to a separate wearable appliance, which may be worn by the user like a pair of glasses.

FIG. 1 is a perspective view illustrating an optical apparatus in accordance with one embodiment, and FIG. 2A is an exploded perspective view illustrating the optical apparatus in accordance with the embodiment. FIG. 2B is a plan view illustrating the path of light, which forms an image, in the optical apparatus in accordance with the embodiment.

The optical apparatus in accordance with the embodiment may include a light source unit 1000, a light guide unit 1100, a beam ejection unit 1200, a display unit 1300, a polarizer 1400, a lens 1500, a first prism 1600, and a second prism 1700.

In addition, the optical apparatus in accordance with the embodiment may include a base 1800, a cover member 1900, and fastening members 2200, in order to couple the respective components mentioned above into a bundle. In addition, the optical apparatus of the embodiment may include a printed circuit board 2000 and a connector 2100, which may electrically connect the optical apparatus to an external apparatus, and may allow the optical apparatus to receive a playback image from the external apparatus.

The light source unit 1000 may be electrically connected to the printed circuit board 2000, may receive current via the printed circuit board 2000, and may emit light. The light source unit 1000 may be formed of various devices that emit light, and for example, may be formed of small LEDs, which have excellent durability and emit less heat.

The light guide unit 1100 may serve to adjust the path of light so that the light emitted from the light source unit 1000 is directed to the beam ejection unit 1200. As illustrated in FIG. 2B, when viewing about the light guide unit 1100, the light source unit 1000 and the beam ejection unit 1200 are arranged approximately perpendicular to each other. As such, in order to direct the light, which forms an image, emitted from the light source unit 1000 to the beam ejection unit 1200, the light guide unit 1100 may include a plurality of lattices, which are located at appropriate positions and are oriented at appropriate angles within the light guide unit 1100.

In addition, the light guide unit 1100 may serve to uniformly distribute the light, emitted from the light source unit 1000, to the beam ejection unit 1200, through the provision of the lattices. Accordingly, the light, uniformly emitted from the light guide unit 1100, may be uniformly introduced to the surface of the beam ejection unit 1200, which is close to the light guide unit 1100.

The beam ejection unit 1200 may serve to emit the light, introduced from the light guide unit 1100, to the display unit 1300, and to emit a playback image, received from the display unit 1300, to the lens 1500 in order to allow a user to view the image at full length with the naked eye.

That is, the beam ejection unit 1200 may transmit light to the display unit 1300 or may receive light, which forms a playback image, from the display unit 1300, and may adjust the path of light, which forms the playback image, received from the display unit 1300.

In order to define the path of light, the beam ejection unit 1200 may take the form of a polarizing beam splitter (PBS), for example. The polarizing beam splitter may be manufactured by coupling a plurality of lattices, and forming a coating layer, which is capable of reflecting and/or diffracting light, on each lattice.

The display unit 1300 serves to play an image back so as to allow the user to concretely detect the form of the image with the naked eye. The display unit 1300 may be, for example, a reflective display, which emits the playback image to the beam ejection unit 1200.

The reflective display may be of, for example, a Liquid Crystal on Silicon (LCoS) type. In the LCoS display, a silicon substrate is mainly used as a display device, and a high-resolution image may be displayed on a small display screen.

The polarizer 1400 may serve to polarize the image-forming light introduced from the display unit 1300. The polarizer 1400 may serve to transmit a p-wave component of light and absorb an s-wave component of the introduced image-forming light.

At this time, the p-wave is a light wave that vibrates in the direction parallel to an incident plane, and the s-wave is a light wave that vibrates in the direction perpendicular to an incident plane. Here, "incident plane" refers to a plane that is defined by an incident light wave, a reflected light wave, and a transmitted light wave in a medium into which light is introduced.

The polarizer 1400 transmits only the p-wave light, among the introduced light, and therefore the light that passes through the polarizer 1400 and is introduced to the lens 1500 includes only the p-wave component. Of course, conversely, the light that passes through the polarizer 1400 and is introduced to the lens 1500 may include only the s-wave component when some other kind of polarizer 1400 is used.

The polarizer 1400 described above may prevent deterioration in the quantity of an image due to interference between the p-wave component and the s-wave component of light caused when the introduced light, which forms an image, includes both the p-wave component and the s-wave component.

Meanwhile, in the same manner as the polarizer 1400, the light guide unit 1100 may have a polarization function so as to prevent deterioration in the quality of an image due to the inference between the p-wave component and the s-wave component of light by polarizing the light introduced from the light source unit 1000.

The lens 1500 may transmit the image from the display unit 1300. In addition, the lens 1500 may receive and enlarge the image-forming light introduced from the polarizer 1400. That is, because the image formed by the light introduced from the polarizer 1400 is very small, it is inconvenient for the user to view the image. Therefore, the lens 1500 may serve to enlarge the image to a size suitable for viewing by the user with the naked eye.

In addition, the lens 1500 may serve to compensate for, for example, chromatic aberration and spherical aberration of the introduced light, may change the path of light by refracting the introduced light, and may increase the resolution of the image formed by the introduced light.

The light, which has formed the enlarged image by passing through the lens 1500, is introduced to the first prism 1600. At this time, in order to appropriately adjust the path of the light introduced from the lens 1500 to the first prism 1600, a refractor may be formed on a portion of the lens 1500. The refractor may be formed, for example, by coupling a medium, having a different density from the remaining portion of the lens 1500, to a portion of the lens 1500.

The first prism 1600 may serve to allow the image, transmitted from the lens 1500, to reach the user's eyeball E. To this end, the path of the image-forming light from the lens 1500 needs to be appropriately adjusted. The adjustment of the path of light may be accomplished using total reflection on the first prism 1600. In addition, a reflective layer (not illustrated) may be formed on the first prism 1600.

At this time, the image, which is directed from the lens 1500 to the user's eyeball E through the first prism 1600, is a virtual image. That is, unlike a real image, which is an image of a real object located in front of the user's eyeball E, the image is a virtual image that the user visually perceives, which is not located in front of the user's eye ball, but is played back on the display unit 1300 as if it were located in front of the user's eyeball E owing to the adjustment of the path of light as described above.

The path of light, which forms the virtual image, in the optical apparatus of the embodiment is as illustrated in FIG. 2B. Specifically, first, the light source unit 1000 electrically connected to the printed circuit board 2000 emits light to the light guide unit 1100.

Subsequently, the light guide unit 1100 adjusts the path of light introduced from the light source unit 1000 so that the light is directed to the beam ejection unit 1200. At this time, the light guide unit 1100 may serve to uniformly distribute the light, emitted from the light source unit 1000, to the beam ejection unit 1200 owing to the lattices thereof. In addition, the light guide unit 1100 may have a polarization function so as to prevent deterioration in the quality of an image due to interference between the p-wave component and the s-wave component of light by polarizing the light introduced from the light source unit 1000.

Subsequently, the beam ejection unit 1200 emits the light, introduced from the light guide unit 1100, to the display unit 1300.

Subsequently, the display unit 1300 plays an image back, and again emits light, which forms the playback image, to the beam ejection unit 1200.

Subsequently, the beam ejection unit 1200 emits the image-forming light, introduced from the display unit 1300, to the polarizer 1400. At this time, the beam ejection unit 1200 may take the form of a polarizing beam splitter as described above in order to adjust the path of light in various ways.

Subsequently, the polarizer 1400 polarizes the image-forming light introduced from the beam ejection unit 1200. At this time, because the polarizer 1400 transmits only the p-wave component or the s-wave component of light and absorbs the other light wave, the light that passes through the polarizer 1400 is polarized so as to have only one of the p-wave component and the s-wave component of light. This serves to prevent deterioration in the quality of image due to interference between the p-wave component and the s-wave component of light as described above.

Subsequently, the lens 1500 serves to receive and enlarge the image-forming light, introduced from the polarizer 1400, to a size suitable for viewing by the user with the naked eye. At this time, as described above, a refractor may be formed on a portion of the lens 1500 for adjustment of the path of light, and the light that passes through the refractor is introduced to the first prism 1600 at a set angle of incidence.

Subsequently, the first prism 1600 may serve to adjust the path of the image-forming light transmitted from the lens 1500, thereby finally emitting the image-forming light to the user's eyeball E. At this time, the adjustment of the path of light may be implemented using the total reflection of the first prism 1600 or a reflective layer formed on the first prism 1600.

The second prism 1700 may be coupled to the first prism 1600 and may serve to reduce the distortion of the image that actually reaches the user's eyeball E. The user can simultaneously view both the virtual image, which is the image played back on the display unit 1300, and the real image of an object that is present in front of the user's eyeball E, via the first prism 1600.

However, when the user's eyeball E and the end of the first prism 1600 are arranged close to each other, the real image, which reaches the user's eyeball E, may be distorted due to the shape of the end of the first prism 1600. This is because the refraction, diffraction or the like of light, which shows the real image, may occur due to the shape of the end of the first prism 1600.

Therefore, when the second prism 1700 is coupled to the end of the first prism 1600 so that the entire prism is extended, it is possible to reduce the distortion of the real image caused by the shape of the end of the first prism 1600.

The base 1800 may have an accommodation space formed therein, and may serve to accommodate, for example, the light guide unit 1100, the beam ejection unit 1200, the display unit 1300, the polarizer 1400, and the lens 1500 in the accommodation space. The base 1800 may have a complicated shape because it accommodates several components of the embodiment. Therefore, the base 1800 may be manufactured using a method that enables the manufacture of a complicated structure, for example, injection molding.

The cover member 1900 may close at least a portion of the top of the base 1800 so as to allow the respective components to be stably accommodated in the base 1800. In addition, the cover member 1900 may be coupled to the base 1800 by the fastening members 2200.

In addition, bosses 171 may be formed on the upper surface of the cover member 1900. When the bosses 171 are coupled to recesses or holes formed in the printed circuit board 2000, the top of the printed circuit board 2000 may be coupled to the cover member 1900.

The top and bottom of the printed circuit board 2000 may be coupled to the cover member 1900 and the base 1800, and may be electrically connected to the light source unit 1000 and the display unit 1300. In this way, the printed circuit board 2000 may transmit an image signal to be played back to the light source unit 1000, and may supply required power to the light source unit 1000 and the display unit 1300.

Meanwhile, the printed circuit board 2000 may have recesses or holes formed in the top and bottom thereof. As such, the top and bottom of the printed circuit board 2000 may be coupled to the bosses 171 formed on the upper surface of the cover member 1900 and bosses 171 formed on the lower surface of the base 1800.

The connector 2100 may serve to connect the printed circuit board 200 and an external apparatus to each other. At this time, the external apparatus may include, for example, a controller, which controls the optical apparatus of the embodiment, a storage device in which images to be played back are recorded, and a communication device, which may link a mobile appliance, such as, for example, a smart phone, to the optical apparatus.

The fastening members 2200 may serve to couple the cover member 1900 and the base 1800 to each other. Thus, the fastening members 2200 may be any fastening members so long as they can be inserted into the holes or recesses formed in each of the cover member 1900 and the base 1800 so as to separably couple the cover member 1900 and the base 1800. For example, the fastening members 2200 may be bolts, screw nails, or coupling pins.

FIG. 3 is a plan view illustrating a part of the optical apparatus in accordance with the embodiment. FIG. 4 is an enlarged front view of portion C in FIG. 3. FIG. 5A is an enlarged plan view of portion C in FIG. 3. FIG. 5B is a view illustrating a filler 200 added to FIG. 5A.

The optical apparatus of the embodiment may include an adjustment unit. The adjustment unit may serve to adjust the path of light, which passes through the lens 1500, by moving the lens 150 relative to the base 1800.

For example, as illustrated in FIG. 3, the adjustment unit may rotate the lens 1500 relative to the base 1800 about the z-axis, which is perpendicular to the x-axis, which is parallel to the width direction of the base 1800, thereby adjusting the angle of rotation of the lens 1500 about the z-axis.

That is, the lens 1500 may be rotated, for example, from the position represented by the solid line in FIG. 3 to the position represented by the dashed line by the adjustment unit. The adjustment unit may adjust the path of light, which passes through the lens 1500 and is introduced to the first prism 1600, by rotating the lens 1500.

As the path of light introduced to the first prism 1600 is adjusted as described above, the user can adjust the quality of then image contained in the light that is ultimately introduced to the user's eyeball E. In addition, through the adjustment of the path of light, it is possible to prevent an unintended image or an image containing noise from being introduced to the eyeball E.

Meanwhile, the adjustment unit may include an adjustment lever 100 in one embodiment. The adjustment lever 100 may be coupled at one end thereof to the lens 1500, and the other end of the adjustment lever 100 may be exposed outside the base 1800. The user may rotate the lens 1500 relative to the base 1800 about the z-axis by moving the other side of the adjustment lever 100 along the y-axis.

As illustrated in FIG. 4, at least a portion of the adjustment lever 100 may be exposed outside the base 1800 through a guide hole 180 formed in the base 1800, and the user may be able to adjust the angle of the lens 1500 by moving the exposed portion of the adjustment lever 100 outside the base 1800.

Meanwhile, it is necessary to maintain the adjustment lever 100 at the moved position on the y-axis without a risk of unintentional movement. To this end, the width of the guide hole 180 between the upper and lower surfaces 180*a* may be adjusted to allow the adjustment lever 100 to come into frictional contact with the upper and lower surfaces 180*a* of the guide hole 180.

At this time, the magnitude of friction generated between the outer circumferential surface of the adjustment lever 100 and the upper and lower surfaces 180*a* of the guide hole 180 may be set to an appropriate value, which allows the user to move the adjustment lever 100 along the guide hole 180 without applying great force, but prevents the adjustment lever 100 from sliding on the upper and lower surfaces 180*a* so long as an external force, greater than the force required for the user to move the adjustment lever 100, is not applied.

In order to generate the above-described magnitude of friction between the outer circumferential surface of the adjustment lever 100 and the upper and lower surfaces 180*a* of the guide hole 180, it is necessary to appropriately adjust the radius of the cross section of the adjustment lever 100 and the distance between the upper and lower surfaces 180*a* of the guide hole 180.

In addition, by forming a coating layer, formed of a flexible material, such as, for example, rubber, on the circumferential surface of the adjustment lever 100 and the upper and lower surfaces 180*a* of the guide hole 180, it is possible to reduce wear of the adjustment lever 100 and the guide hole 180 caused by friction between the adjustment lever and the guide hole 180 while maintaining the magnitude of friction described above.

As described above, when the adjustment lever 100 and the upper and lower surfaces 180*a* of the guide hole 180 come into frictional contact with each other, the adjustment lever 100 may remain stationary at the moved position in the guide hole 180.

In addition, when the adjustment lever 100 and the upper and lower surfaces 180*a* of the guide hole 180 come into frictional contact with each other, the resulting friction may reduce the shaking of the lens 1500. In addition, as described above, when the coating layer, formed of a flexible material, such as, for example, rubber, is formed on the outer circumferential surface of the adjustment lever 100 or the upper and lower surfaces 180*a* of the guide hole 180, the coating layer may serve to absorb shocks, and therefore may further reduce the shaking of the lens 1500.

The lens 1500 may include a first protrusion 151 and a second protrusion 152. The first protrusion 151 may be formed on one side of the lens 1500 and may be coupled at the end thereof to the adjustment lever 100. Meanwhile, as illustrated in FIG. 5A, the base 1800 may include a first indentation 182, which is configured to accommodate at least a portion of the first protrusion 151 or the adjustment lever 100 and communicates with the guide hole 180.

The lens 1500, the first protrusion 151, and the adjustment lever 100, represented by the solid line in FIG. 5A, may move to the positions of a lens 1500', a first protrusion 151' and an adjustment lever 100' represented by the dashed line while being accommodated in the first indentation 182 and inside the base 1800. Through this movement, the position and attitude of the lens 1500 relative to the base 1800 may be adjusted, and consequently, the path of light passing through the lens 1500 may be adjusted.

The adjustment lever 100 may be appropriately designed so as to be movable along the guide hole 180 until it comes into contact with opposite surfaces of the guide hole 180. Accordingly, the width of the first indentation 182 may be equal to or greater than the width between the opposite surfaces of the guide hole 180 so as not to interfere with the movement of the adjustment lever 100.

The first protrusion 151 is the region that is coupled to the adjustment lever 100. Thus, one end of the adjustment lever 100 and the end of the first protrusion 151 may be coupled to each other via, for example, an adhesive, may be screwed to each other, or may be integrally formed with each other via, for example, injection molding.

The second protrusion 152 may be formed on the other side of the lens 1500, which is opposite to the side on which the first protrusion 151 is formed. The second protrusion 152 may be supported by third protrusions 184, which are formed in a second indentation 183 in which the second protrusion 152 is accommodated. This will be described below with reference to FIG. 7.

As illustrated in FIG. 5B, the optical apparatus of the embodiment may include a filler 200. The filler 200 may be provided in the first indentation 182 so as to surround at least a portion of the first protrusion 151 or the adjustment lever 100.

The filler 200 may be formed of a flexible material, such as, for example, sponge. The filler 200 may be charged in the space defined by the first indentation 182 and the first protrusion 151 or the adjustment lever 100 accommodated in the first indentation 182. In addition, the filler 200 may be charged in at least a portion of the guide hole 180.

The filler 200 may close the guide hole 180, thereby serving to prevent foreign substances from entering the space inside the base 1800 and the lens 1500 from outside through the guide hole 180. At this time, because the filler 200 is formed of a flexible material, the filler 200 may be deformed when the first protrusion 151 or the adjustment lever 100 is moved, thus keeping the guide hole 180 closed.

The filler 200 may serve to prevent foreign substances from being entering the guide hole 180 and contaminating the lens 1500, thereby preventing deterioration in the optical performance of the lens 1500.

In addition, the filler 200 is deformed when the adjustment lever 100 or the first protrusion 151 is moved, thus serving as a damper. Accordingly, the filler 200 may limit the rapid movement of the adjustment lever 100 or the first protrusion 151, thereby increasing the precision with which the position and attitude of the lens 1500 can be adjusted.

At this time, the filler 200 may be attached to opposite side surfaces or the bottom surface of the indentation using, for example, an adhesive, so as to be fixed to and charged in the indentation.

FIG. 6 is an enlarged plan view of portion D in FIG. 3. As illustrated in FIG. 6, the optical apparatus of the embodiment may include a second indentation 183 and the third protrusions 184.

Referring to FIG. 3, the second indentation 183 may be formed in one of both inner side surfaces of the base 1800, which is opposite to the side surface in which the first indentation 182 is formed, and at least a portion of the second protrusion 152 may be accommodated in the second indentation 183.

The third protrusions 184, as illustrated in FIG. 6, may protrude from both side surfaces of the second indentation 183, excluding the open region of the second indentation 183 and the closed region opposite to the open region. At this time, each of the third protrusion 184 may come into contact at the end thereof with the second protrusion 152, thereby serving to limit the shaking of the lens 1500.

Accordingly, although the lens 1500 may be rotated about the z-axis via the movement of the adjustment lever 100, the shaking of the lens 1500 is limited by the friction between the guide hole 180 and the adjustment lever 100 and the contact between the third protrusions 184 and the second protrusion 152.

In this way, even when the user who wears the optical apparatus of the embodiment moves, the lens 1500 may be stably mounted, thereby allowing the user to view a high-quality image.

Meanwhile, the second protrusion 152 may be rotated simultaneously when the lens 1500 is rotated relative to the base 1800, and each third protrusion 184 may come into rolling contact on at least a portion thereof with the second protrusion 152 when the second protrusion 152 is rotated.

For the rolling contact described above, the third protrusion 184 may have, for example, an arched shape, a semi-circular shape, or a curved shape, and thus may come into rolling contact on at least a portion thereof with the second protrusion 152 when the second protrusion 152 is rotated.

For example, as illustrated in FIG. 6, when the lens 1500 and the second protrusion 152, represented by the solid line, are moved to the positions of a lens 1500' and a second protrusion 152', represented by the dashed line, via the movement of the adjustment lever 100, the second protrusion 152 is rotated relative to the third protrusions 184, which are fixed to the base 1800.

At this time, the second protrusion 152 and the third protrusion 184 may come into rolling contact with each other on at least a portion thereof. Because rolling contact entails much less friction than sliding contact, wear of the second protrusion 152 or the third protrusion 184 may be remarkably reduced, compared to sliding contact between the entire second protrusion and the third protrusion 184, through the provision of the rolling contact region between the second protrusion 152 and the third protrusion 184.

In addition, through the rolling contact between the second protrusion 152 and the third protrusion 184, the position and attitude of the lens 1500 may be adjusted by applying smaller torque to the adjustment lever 100 than that in the sliding contact between the entire second protrusion 152 and the third protrusion 184, and the second protrusion 152 may be more smoothly rotated relative to the base 1800.

FIG. 7 is a view illustrating the adjustment lever 100 in accordance with another embodiment. As illustrated in FIG. 7, the adjustment lever 100 in accordance with another embodiment may be configured such that at least a portion thereof is exposed outside the base 1800 through the guide hole 180 formed in the base 1800 and the outer circumferential surface of the adjustment lever 100 is engaged with the surface of the guide hole 180.

To this end, the adjustment lever 100 may include a gear 110 and a gripper 120, and the guide hole 180 may have second teeth 181 formed on the upper and lower surfaces 180a thereof so as to be engaged with the gear 110.

The gear 110 may be rotatably coupled at one side thereof to the lens 1500, and may have first teeth 111 formed on the outer circumferential surface thereof. The first teeth 111 may have, for example, a shape and size so as to be engaged with the second teeth 181. The gripper 120 may be coupled to the other side of the gear 110 and may serve to rotate the gear 110.

The gripper 120 may be coupled to the gear 110 using, for example, an adhesive or screws. In addition, the gripper 120 and the gear 110 may be integrally formed with each other via injection molding.

As described above, the guide hole 180 may be provided on at least a portion of the surface thereof, more particularly, on the upper and lower surfaces 180a with the second teeth 181, which are engaged with the first teeth 111 of the gear 110. At this time, as the first teeth 111 and the second teeth 181 are engaged with each other, the adjustment lever 100 is adapted so as not to move along the guide hole 1800 by itself so long as the user does not move the adjustment lever 100 by rotating the gripper 120.

Accordingly, in the same manner as in the embodiment illustrated in FIG. 5A, the adjustment lever 100 of the present embodiment may remain stationary at the moved position in the guide hole 180.

In the embodiment, when the user rotates the gripper 120, the gear 110 may be rotated to thereby be moved along the guide hole 180. As such, the first protrusion 151 and the lens 1500 coupled to the gear 110 are moved, and thus the user may adjust the path of light passing through the lens 1500 by adjusting the position and attitude of the lens 1500.

Meanwhile, the filler 200 illustrated in FIG. 5B may also be provided in the embodiment of FIG. 7, and may serve as a damper, which closes the guide hole 180 so as to prevent foreign substances from entering the base 1800 and the lens 1500.

In the embodiment, the optical apparatus may easily adjust the path of light passing through the lens 1500, thereby optimizing the path of light using the adjustment unit, which can be directly adjusted by the user and serves to move the lens 1500.

In this way, the quality of an image displayed on the optical apparatus may be improved by removing an unintended image or an image containing noise caused by the unintended formation of the path of light.

FIG. 8 is a view illustrating a head-mounted display apparatus, which is one embodiment of the optical apparatus.

Referring to FIG. 8, the head-mounted display apparatus includes a display device 10, a lens 12, and a prism 14.

The display device 10 serves to emit light, which forms an image. The display device 10 may be a reflective Liquid Crystal on Silicon (LCos) device, a Digital Light Processing (DLP) device, a micro LCD device provided with a light source, or a self-illuminating micro OLED device, and may have a size of 1 inch or less. Meanwhile, because the reflective LCoS device, the DLP device, and the micro LCD device are not self-illuminating devices, an external light source needs to be coupled. That is, a transmissive micro LCD panel using a backlight or a reflective micro LCD panel using a front light may be used. Because the micro OLED device is self-illuminating, a separate light source is not required, and therefore the head-mounted display apparatus may be configured to have a smaller size. When a light source is provided, the light source may have three wavelength bands, namely red R, green G, and blue B. At this time, an optical system, which adjusts the path of light so that light emitted from the light source is introduced to the display device 10, may be used. For example, the light source may be configured as a mirror having a concave reflective surface.

The lens 12 is called a condensing lens, which adjusts the path of light emitted from the display device 10 and condenses light on the prism 14. The condensing lens is a lens that collects luminous flux (a bundle of light rays), which are emitted within a certain solid angle from a light source, into a smaller solid angle so as to achieve high illumination. The condensing lens may not require as much precision as an image forming lens, and the light condensing solid angle may be as large as possible. Accordingly, the condensing lens has a larger aperture than a focal distance. The lens 12 may be a combination of lenses selected from at least one spherical lens and at least one aspheric lens.

The prism 14 is an optical device, which adjusts the path of introduced light so as to direct the light to the observer's pupil, and includes reflective surfaces 15 and 16, which reflect light introduced through the lens 12, and a reflective mirror 17, which is inclined relative to the reflective surfaces 15 and 16 by a prescribed angle so as to refract and emits light. The reflective mirror 17 may be a beam splitter or a half mirror, which selectively transmits light according to the wavelength or polarization component thereof.

With the configuration described above, the image on the display device 10 is introduced to the eye E of the observer. At this time, light introduced in a first path R1 is reflected by the first reflective surface 15, and light introduced in a second path R2 is reflected by the second reflective surface 16, whereby all of the light is emitted through the reflective mirror 17. However, in practice, there exist light other than the light emitted from the display device 10, and thus flaring or ghosting occurs. That is, miscellaneous light is generated, which causes deterioration in the quality of an image.

Accordingly, the removal of miscellaneous light is required in order to achieve a vivid high-quality image.

FIG. 9 is a view illustrating the results of the simulation of the generation of miscellaneous light in the head-mounted display apparatus. Referring to FIG. 9, it can be seen that miscellaneous light is generated in a region A and a region B.

In the present embodiment, for the removal of miscellaneous light, a grating structure, a holographic optical element, or a moth eye structure is applied to a housing of the prism.

Although the present embodiment exemplifies that any one of the structures mentioned above is applied to the prism used in the head-mounted display apparatus described in FIG. 8, the structure may be equally applied to other optical apparatuses.

FIG. 10 is a view illustrating a grating structure applied to a housing in the optical apparatus in accordance with one embodiment.

The housing 30 may have an elongated hexahedral shape, and the remaining portion of the housing 30 excluding a portion for the introduction and emission of light, i.e. an upper surface 32, a lower surface, a front surface 34, and a rear surface thereof may be formed of the same material and may have the same configuration.

One surface of the housing 30 may have the configuration illustrated in FIG. 10, and grooves having a prescribed width W are formed at a constant interval. With this configuration, even if miscellaneous light 36 is introduced from the outside, it is possible to prevent the generation of noise due to the miscellaneous light.

At this time, a pitch forms a pattern according to the wavelength and angle of incidence of miscellaneous light introduced from the outside. The following Equation represents the relationship between external miscellaneous light and pattern light.

$$P = \frac{\lambda}{Z\sin\theta} \qquad \text{Equation 1}$$

P is the pitch, λ is the wavelength of miscellaneous light, and θ is the angle of incidence of miscellaneous light.

That is, the pitch may be proportional to the wavelength of miscellaneous light, and may be inversely proportional to the angle of incidence of miscellaneous light.

In addition, the grating structure may adopt a triangular grating, protrusions of which have a triangular shape.

FIG. 11 is a view illustrating a holographic optical element applied to the optical apparatus in accordance with one embodiment.

A holographic optical element is an optical element using the holographic principle. The holographic optical element may be formed of a transparent material, and may control almost 100% of light having a specific angle of incidence and a specific wavelength. Accordingly, the holographic optical element may refract or reflect 100% of the light, and may divide light according to the ratio 50:50.

The holographic optical element is configured such that a high refractive index material 42 and a low refractive index material 44 are alternately arranged as illustrated. At this time, in the same manner as the grating structure described above, the pitch may depend on the wavelength and angle of incidence of miscellaneous light 46, and the same equation as the above Equation, which represents the pitch pattern of the above-described grating structure, may be equally applied to the pitch. That is, the pitch of the holographic optical element is proportional to the wavelength of miscellaneous light and is inversely proportional to the angle of incidence of miscellaneous light.

In addition, when the moth eye structure is applied to the housing, the removal of miscellaneous light may be accomplished.

The moth eye structure refers literally to the structure of a moth's eye, and is a nipple-shaped nanostructure having a period of approximately 200 nm and a height of approximately 150 nm. When the moth eye structure is applied, the reflection of light may be reduced regardless of the wavelength of light. When the period of the nano structure is sufficiently smaller than the wavelength of light, the nano structure is perceived as if it were a single medium in terms of light. Because the moth eye structure has a gently inclined surface, it is perceived as a medium, the effective index of refraction of which gradually varies. Because the reflection of light is caused by the difference between the indices of refraction of media, this structure may effectively reduce the reflection of light.

Any one of the grating structure, the holographic optical element, and the moth eye structure may be applied to the prism, and ghosting due to miscellaneous light may be effectively reduced regardless of which structure is applied. At this time, the structure may be applied to only one surface of the housing, or may be applied simultaneously to all of four surfaces including the upper surface, the lower surface, the rear surface, and the front surface.

Figure 12B:
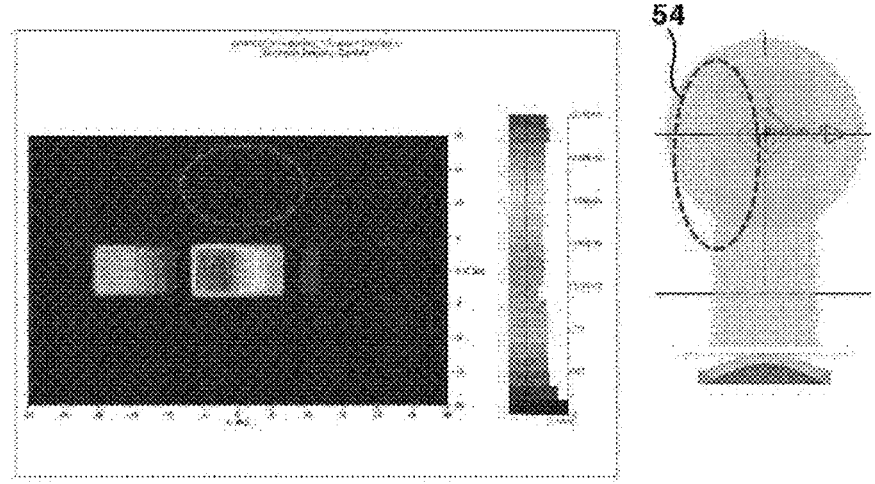

FIGS. 12(a) and 12(b) are views illustrating the measured results of the simulation of the generation of miscellaneous light in a conventional optical apparatus and the optical apparatus in accordance with the embodiment.

FIG. 12(a) illustrates the generation of miscellaneous light when a conventional prism is used, and FIG. 12(b) illustrates the generation of miscellaneous light when the triangular grating structure in accordance with one embodiment is applied to the prism. As can be appreciated, a miscellaneous light generation region 52 is large in FIG. 12(*a*), whereas a miscellaneous light generation region 54 is almost nonexistent in FIG. 12(*b*).

Although only several embodiments have been described above, various other embodiments are possible. The technical contents of the above-described embodiments may be combined into various forms, without being incompatible, and thus, may be implemented in new embodiments.

INDUSTRIAL APPLICABILITY

In the embodiments, an optical apparatus includes an adjustment unit, which can be directly adjusted by a user and serves to move a lens, thereby easily adjusting the path of light passing through the lens, and consequently optimizing the path of light. Accordingly, the optical apparatus of the embodiments has industrial applicability.

The invention claimed is:

1. An optical apparatus comprising:
   a display unit;
   a lens having a first protrusion and a second protrusion and configured to pass an image formed by and transmitted from the display unit, and transmitting light having any one of a p-wave and a s-wave;
   a base having a guide hole and configured to accommodate the lens therein; and
   an adjustment unit configured to move the lens relative to the base so as to adjust a path of light passing through the lens;
   wherein the adjustment unit is configured to be movable in a first direction such that the lens is movable relative to the base in a second direction perpendicular to the first direction,
   wherein the lens is movable relative to the base by moving an adjustment lever, and
   wherein the base includes a first indentation configured to accommodate at least a portion of the adjustment lever or the first protrusion therein, the first indentation communicating with the guide hole, and a second indentation configured to accommodate at least a portion of the second protrusion therein.

2. The optical apparatus according to claim 1, wherein at least a portion of the adjustment lever is exposed outside the base through the guide hole formed in the base, and
   wherein the adjustment lever remains stationary at a position in the guide hole when an outer circumferential surface of the adjustment lever comes into frictional contact with a surface of the guide hole.

3. The optical apparatus according to claim 1, wherein at least a portion of the adjustment lever is exposed outside the base through the guide hole formed in the base, and
   wherein the adjustment lever has an outer circumferential surface configured to be engaged with a surface of the guide hole.

4. The optical apparatus according to claim 3, wherein the adjustment lever includes:
   a gear having one side rotatably coupled to the lens and first teeth formed on an outer circumferential surface thereof; and
   a gripper coupled to an opposite side of the gear and configured to rotate the gear.

5. The optical apparatus according to claim 4, wherein the guide hole includes second teeth formed on at least a portion of the surface thereof so as to be engaged with the first teeth.

6. The optical apparatus according to claim 3, wherein the first protrusion is formed on one side of the lens so as to be coupled to the adjustment lever and the second protrusion is formed on an opposite side of the lens.

7. The optical apparatus according to claim 6, wherein the first indentation is provided with a filler formed of a flexible material, the filler surrounding at least a portion of the adjustment lever or the first protrusion.

8. The optical apparatus according to claim 6, wherein the second indentation is provided with a third protrusion, an end of which comes into contact with the second protrusion so as to limit shaking of the lens.

9. An optical apparatus comprising:
   a lens having a first protrusion and a second protrusion and transmitting light having any one of a p-wave and a s-wave;
   a base having a guide hole and configured to accommodate the lens therein; and
   an adjustment lever having one end coupled to the lens and an opposite end exposed outside the base, the adjustment lever being configured to be movable in a first direction such that the lens is movable relative to the base in a second direction perpendicular to the first direction to adjust a path of light passing through the lens;
   wherein the lens is movable relative to the base by moving the adjustment lever, and
   wherein the base includes a first indentation configured to accommodate at least a portion of the adjustment lever or the first protrusion therein, the first indentation communicating with the guide hole, and a second indentation configured to accommodate at least a portion of the second protrusion therein.

10. The optical apparatus according to claim 9, wherein at least a portion of the adjustment lever is exposed outside the base through the guide hole formed in the base, and
    wherein the adjustment lever has an outer circumferential surface configured to come into frictional contact with a surface of the guide hole.

11. The optical apparatus according to claim 9, wherein the adjustment lever includes a gear having one side rotatably coupled to the lens and first teeth formed on an outer circumferential surface thereof, and a gripper coupled to an opposite side of the gear and configured to rotate the gear,
    wherein the base includes the guide hole provided on at least a portion of a surface thereof with second teeth configured to be engaged with the first teeth, and
    wherein a user rotates the lens relative to the base by rotating the gripper.

12. An optical apparatus comprising a housing configured to change a path of light of an image emitted from a display device so as to provide an observer with the resulting image, wherein the housing comprises:
    a reflective surface configured to reflect light emitted from the display device; and
    a mirror in contact with the reflective surface and inclined relative to the reflective surface by a prescribed angle so as to vertically emit the light reflected from the reflective surface to an outside, and
    wherein the housing has a holographic optical element including a high refractive index material and a low refractive index material, which are alternately formed in a horizontal direction on the reflective surface.

13. The optical apparatus according to claim 12, wherein the housing has a grating structure having a pitch, which is proportional to a wavelength of external light excluding the light emitted from the display device, and which is inversely proportional to a sine value of an angle of incidence of the external light.

14. The optical apparatus according to claim 12, wherein the housing has a grating structure having a pitch formed as in the following Equation:

$$P = \lambda/2 \sin\theta$$

here, P is the pitch, $\lambda$ is the wavelength of external light, and $\theta$ is the angle of incidence of the external light.

15. The optical apparatus according to claim 12, wherein the housing has a grating structure having a triangular grating structure.

16. The optical apparatus according to claim 12, wherein the holographic optical element is formed of a transparent material.

17. The optical apparatus according to claim 12, wherein the holographic optical element is formed as in the following Equation:

$$P = \lambda/2 \sin\theta$$

here, P is a pitch, $\lambda$ is the wavelength of external light, and $\theta$ is the angle of incidence of the external light.

18. The optical apparatus according to claim 12, wherein the holographic optical element is formed on all inclined surfaces, excluding a light introduction side and a light emission side of the housing, or is selectively formed on one or more surfaces among the inclined surfaces.

* * * * *